United States Patent
Doumuki

(10) Patent No.: US 8,451,224 B2
(45) Date of Patent: May 28, 2013

(54) MAPPING DETECTED MOVEMENT OF AN INTERFERENCE PATTERN OF A COHERENT LIGHT BEAM TO CURSOR MOVEMENT TO EFFECT NAVIGATION OF A USER INTERFACE

(75) Inventor: Tohru Doumuki, Yokohama (JP)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 1256 days.

(21) Appl. No.: 12/178,049

(22) Filed: Jul. 23, 2008

(65) Prior Publication Data

US 2010/0020011 A1    Jan. 28, 2010

(51) Int. Cl.
*G06F 3/033* (2006.01)

(52) U.S. Cl.
USPC ........... 345/158; 345/157; 345/159; 345/163; 345/165; 345/166

(58) Field of Classification Search
USPC ... 345/7–9, 156–179, 183; 362/259; 356/447, 356/28, 498; 359/207.1; 353/31; 382/276; 250/221, 205
See application file for complete search history.

(56) References Cited

U.S. PATENT DOCUMENTS

| | | | |
|---|---|---|---|
| 5,528,264 A | 6/1996 | Kautzer et al. | |
| 5,554,980 A | 9/1996 | Hashimoto et al. | |
| 5,644,126 A | 7/1997 | Ogawa | |
| 5,704,700 A * | 1/1998 | Kappel et al. | 353/31 |
| 5,977,955 A * | 11/1999 | Jaeger | 345/172 |
| 6,081,255 A | 6/2000 | Narabu | |
| 6,130,664 A | 10/2000 | Suzuki | |
| 6,341,183 B1 * | 1/2002 | Goldberg | 382/276 |
| 7,116,427 B2 * | 10/2006 | Baney et al. | 356/498 |
| 7,119,936 B2 * | 10/2006 | Kowarz et al. | 359/207.1 |
| 7,138,620 B2 * | 11/2006 | Trisnadi et al. | 250/221 |
| 7,142,198 B2 | 11/2006 | Lee | |
| 7,161,136 B1 * | 1/2007 | Wenstrand et al. | 250/221 |
| 7,248,345 B2 * | 7/2007 | Todoroff et al. | 356/28 |
| 7,297,912 B1 * | 11/2007 | Todoroff et al. | 250/205 |

(Continued)

FOREIGN PATENT DOCUMENTS

JP    H06-230897 A    8/1994
WO    WO00/60534    10/2000

OTHER PUBLICATIONS

Hanson et al., "Optical sensor systems based on determining angular displacements," *DOPS-NYT*, No. 4, 2000, pp. 26-29.

(Continued)

*Primary Examiner* — Prabodh M Dharia
(74) *Attorney, Agent, or Firm* — Sony Corporation

(57) ABSTRACT

A method, system and apparatus provide that movement of an interference pattern of a coherent light beam is mapped to cursor movement to effect navigation of a user interface. A remote controller operable to emit a coherent light beam is in cooperative arrangement with a display device operable to display a user interface, navigable by means of a cursor. A laser diode element and coupled diffuser element of the remote controller generate the coherent light beam. Movement of the remote controller causes movement of an interference pattern of the coherent light beam impinging upon a sensor of the display device; movement of the interference pattern is sensed by the display device and mapped to corresponding movement of the cursor in the user interface. Thus, the remote controller may be used to navigate an on-screen user interface by movement of the remote controller itself.

19 Claims, 3 Drawing Sheets

U.S. PATENT DOCUMENTS

| | | | |
|---|---|---|---|
| 7,298,460 B2 * | 11/2007 | Xu et al. | 356/28 |
| 7,499,027 B2 * | 3/2009 | Brigham et al. | 345/158 |
| 7,884,801 B1 * | 2/2011 | Xu et al. | 345/166 |
| 2002/0196625 A1 * | 12/2002 | Krietzman | 362/259 |
| 2004/0095317 A1 | 5/2004 | Zhang et al. | |
| 2005/0052345 A1 | 3/2005 | Ballhoefer | |
| 2005/0258346 A1 | 11/2005 | Lehoty et al. | |
| 2005/0258347 A1 * | 11/2005 | Carlisle et al. | 250/221 |
| 2005/0259266 A1 * | 11/2005 | Seko | 356/498 |
| 2005/0259267 A1 * | 11/2005 | Carlisle et al. | 356/498 |
| 2006/0106319 A1 * | 5/2006 | Todoroff et al. | 600/476 |
| 2006/0244719 A1 * | 11/2006 | Brigham et al. | 345/156 |
| 2006/0267935 A1 | 11/2006 | Corson | |
| 2007/0002020 A1 * | 1/2007 | Ranta et al. | 345/166 |
| 2007/0080940 A1 | 4/2007 | Aoki | |
| 2007/0109273 A1 * | 5/2007 | Orsley et al. | 345/173 |
| 2007/0165207 A1 * | 7/2007 | Xu et al. | 356/28 |
| 2007/0242277 A1 * | 10/2007 | Dolfi et al. | 356/498 |
| 2008/0061220 A1 * | 3/2008 | Machida | 250/221 |
| 2008/0094353 A1 * | 4/2008 | Marks | 345/156 |
| 2008/0211766 A1 * | 9/2008 | Westerman et al. | 345/156 |
| 2009/0195503 A1 * | 8/2009 | Lee et al. | 345/166 |
| 2009/0225321 A1 * | 9/2009 | Bendall et al. | 356/447 |

OTHER PUBLICATIONS

Doumuki, PCT ISR and Written Opinion, PCT Appl. No. PCT/US2009/050052, Feb. 24, 2010.

EP No. 09800786.7, Extended European Search Report, Dec. 16, 2011.

* cited by examiner

MAPPING DETECTED MOVEMENT OF AN INTERFERENCE PATTERN OF A COHERENT LIGHT BEAM TO CURSOR MOVEMENT TO EFFECT NAVIGATION OF A USER INTERFACE

COPYRIGHT NOTICE

A portion of the disclosure of this patent document may contain material that is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

As applications available with various Consumer Electronics (CE) devices become richer and more complex, the means of communicating with users of such devices, such as user interfaces (UI), including Graphical User Interface (GUI), have also become more complicated. For example, some recent TVs have an application to show pictures or JPEG images in addition to normal television functioning. Typically thumbnails of pictures are laid out on the TV screen so that a user selects one of them by use of a Remote Controller (RC) to display it in full screen or to retouch. While this type of application is familiar on a PC and is readily controlled by the user by controlling a mouse, using the same type of application on a CE device with a conventional IR remote commander is a challenge and not readily easy to use. When picture thumbnails are arrayed in a 4×5 matrix, for example, moving highlight from bottom left side of the matrix to the other diagonal corner requires seven presses of direction button on RC, which is not convenient. The same operation can be done instantly by a mouse in the case of PC. There thus exists a need to support navigation of UI or GUIs displayed on display devices of CE devices for various applications.

Remote controllers used with CE device have been adapted in an effort to more readily support GUI navigation. For example, the Wii game console has a remote controller that a user can point at a screen by moving the remote controller itself rather than simply moving a highlighted portion on the GUI menu by navigation buttons. This, however, requires motion sensing devices and/or other radio frequency (RF) communication devices to work. RF devices in particular are quite costly and present a problem of high battery consumption.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

Figure 1:
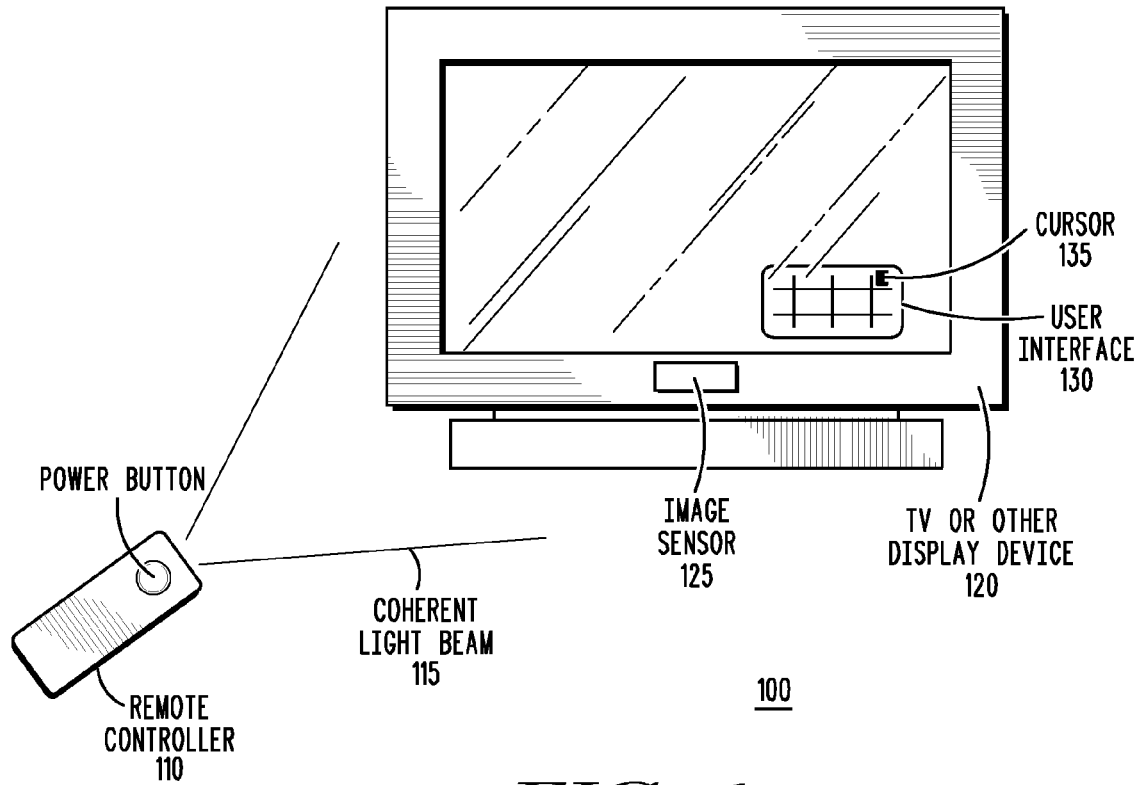
FIG. 1 is a block diagram of a system, in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with embodiments of the present invention, movement of an interference pattern of a sensed coherent light beam is mapped to cursor movement to effect navigation of a user interface. A remote controller operable to emit a coherent light beam is in cooperative arrangement with a display device operable to display a user interface, navigable by means of a cursor. A laser diode element and coupled diffuser element of the remote controller generate the coherent light beam. Impingement of the coherent light beam upon a reflective surface, such as a sensor, causes an interference pattern, such as a scattering or a "speckle pattern", to form. Movement of the remote controller causes movement of the interference pattern that is sensed by the display device and mapped to corresponding movement of the cursor in the user interface. Thus, the remote controller may be used to navigate an on-screen user interface by movement of the remote controller itself.

Referring now to FIG. 1, a system block diagram 100 is shown. The system has a remote controller 110 and a display device, such as a television. The remote controller 110 is a remote controller device, such as a remote control or remote commander, operable to emit a coherent light beam. A user interface (UI) 130, such as a graphical user interface (GUI), is displayed on the display device and is navigable by means of a cursor 135, meaning a graphical tool by which a user of the UI may navigate choices and options presented in the UI and by placement of the cursor over a desired option may select an action or information corresponding to that option. A cursor may be of a pointer cursor type, such as used in a word processing application, for example, or if a GUI has a highlighted menu or index, the cursor may be a highlighted portion that moves. The display device further has an image or imaging sensor element 125, suitable for detecting coherent light information, such as an interference pattern of a coherent light beam.

The display device 120 is operable to display the navigable graphical user interface 130, sense an interference pattern 115 caused by the coherent light beam produced by the remote controller reflecting or impinging a sensor, such as a sensor element of the display device, and detect movement of the interference pattern. As previously stated, the UI 130 is navigable by movement of a cursor 135 of the UI. Movement of the remote controller 110 in turn causes movement of the interference pattern 115 that is sensed by the image sensor 125 of the display device and movement of the interference pattern 115 is mapped to corresponding movement of the cursor 135 in the graphical user interface 130.

As will be explained, in accordance with certain embodiments, the remote controller 110 has laser-diode technology, which may be paired with a diffuser and other optics, such as one or more lenses, to generate the coherent light beam detected by the image sensor of the display device 120. The generated interference pattern caused by the coherent light beam reflecting or impinging a reflective surface may be referred to as a "speckle pattern", a random pattern generated by the interference of the coherent LD light.

With regard to the detection or sensing of the interference pattern, the display device 120 has an imaging sensor 125. When a user points the remote controller 110 at the TV, a part of the speckle pattern of the interference pattern generated by reflection of the coherent light beam is detected by imaging sensor 125. When the user moves the remote control (to effect movement of a cursor within the UI), the speckle pattern on the imaging sensor also moves. Thus, in addition to the image sensor 125, the display device further has a motion sensor element that is operable to sense and capture movement in the interference pattern. It is noted that the imaging sensor element and the motion sensor element of the display device are illustrated by image sensor 125 in the drawing. Moreover, a processing element of the television, in cooperative arrangement with the motion sensor element, is able to process the movement in the interference pattern captured by the motion sensor element and map movement in the interference pattern to corresponding movement of the cursor in the graphical user interface.

Figure 4:
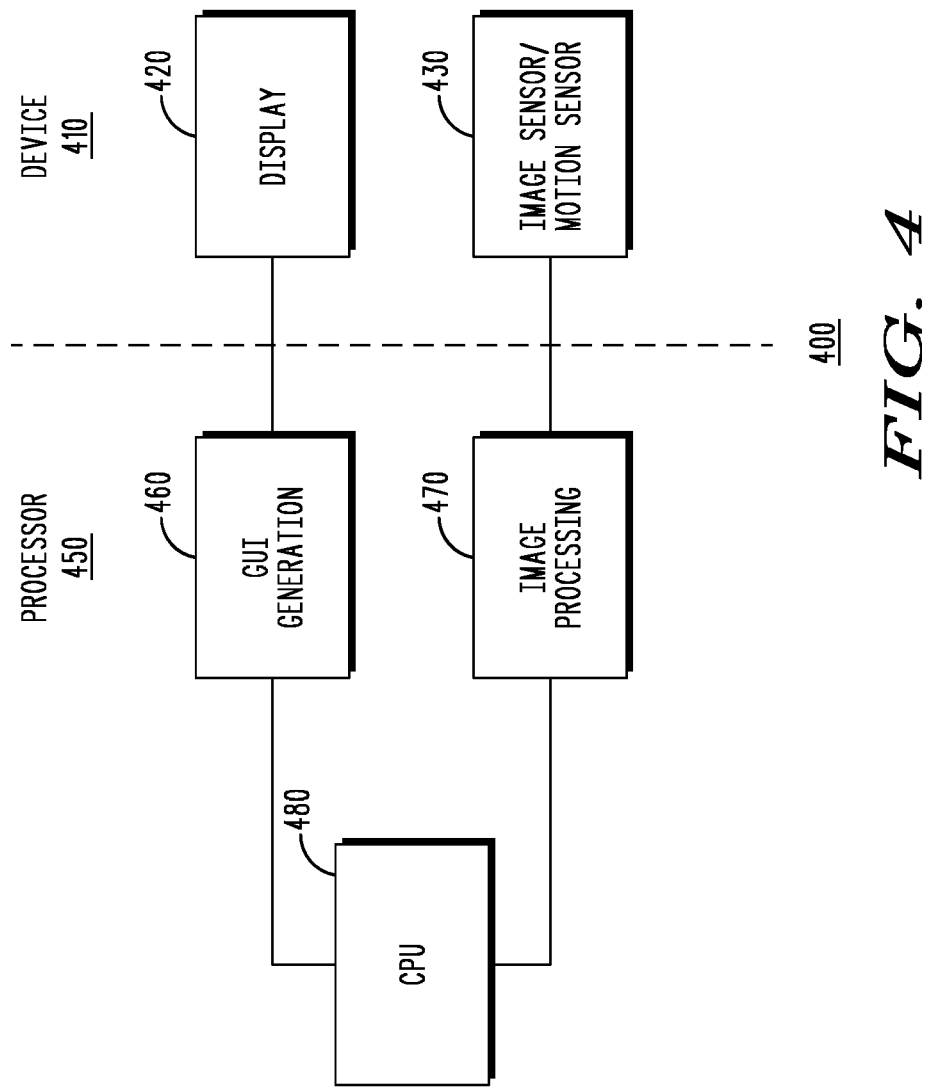
FIG. 4 is a functional block diagram, in accordance with various embodiments.

Reference to functional block diagram 400 of FIG. 4 illustrates the functionality of a processing element 450 to receive and process certain information received from the input/output elements 410 of a display device; the processing element is operatively coupled to the display device to receive the interference pattern generated from the coherent light beam from the remote controller impinging the sensor of the remote controller and sense the movement of the interference pattern detected by the display device. Movement of the remote controller causes movement of the interference pattern that is sensed by the display device and movement of the interference pattern is mapped by the processing element to corresponding movement of the cursor in the user interface. The interference pattern received at an image sensor/motion sensor element 430 of the display device is provided to an image processing block 470 which provides processed image information to a processor (shown here as a central processing unit or CPU) 480. The CPU 480 controls generation and changes in a UI or GUI at block 460; mapping between interference pattern movement and cursor movement is performed at CPU 480 and GUI generation 460. The UI or GUI is sent to display element 420 of the display device 410 for display to the user.

It is further noted that the processing element 450 functionality is discussed as being performed internal to the display device; however, one will understand that one or more of the functions of processor 450 may also be implemented in devices, hardware, or software that does not in fact reside with the display device. This is indicated by the dashed lines between the functionality of the display device input/output functions 420/430 and the processing functions 460, 470, 480, provided by processor element 450. Also, as indicated in the figure, the image sensor function and the motion sensor function may be integrated into one element (co-located), image sensor/motion sensor element 430, or they may be separate elements cooperatively coupled.

By processing the pattern movement, a processor of the display device can determine the direction of the movement of the remote controller. This information is mapped internally to the TV display device to corresponding movement of the cursor within the UI. For example, if a GUI has a pointer cursor (like in a word processing application, for example), the pointer cursor would move in the same direction as the direction in which the remote controller moves. Or, if a GUI has a highlighted menu or index, the cursor highlighting would move in reaction to movement of the remote controller. In this way, the user can effect navigation of the UI by controlling movement of the cursor to a desired location simply by moving the remote controller in the direction necessary to move the cursor to the desired location. Once at the desired location, the user can select the information or option presented to him associated with the cursor position by means of a select mechanism of the remote controller, such as by selecting a "select" button. Thus, a user who wishes to move the cursor up two lines and over one column to the right in a user interface grid (such as a channel selection guide, for example) may accomplish this by moving the remote controller up and then over to the right, or in a north-easterly direction. Mapping movement of the interference pattern to movement of the cursor within the user interface allows the user to easily and intuitively control interaction with the UI. Moreover, as the remote controller is simply a light source, this may be accomplished in a manner in which no RF communication or motion sensing technology is required, hence greatly reducing the cost and battery consumption of the remote controller.

Figure 2:
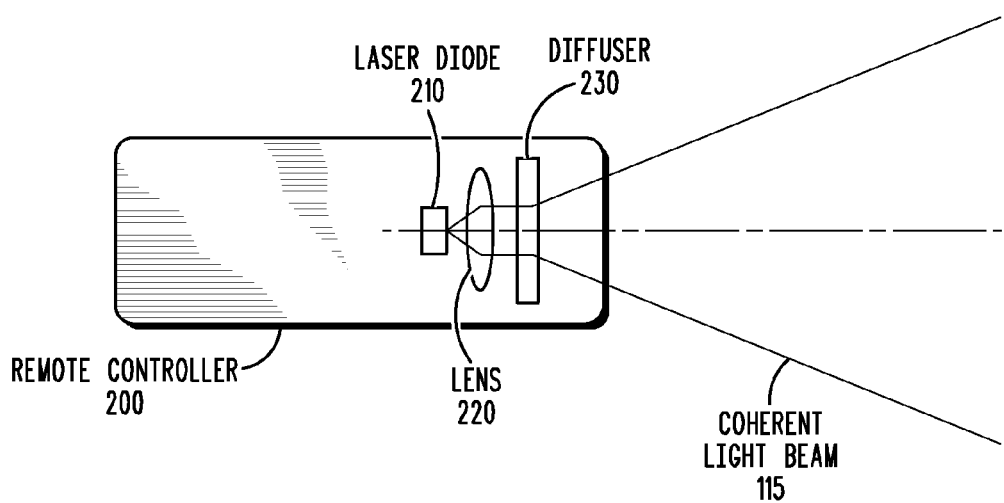
FIG. 2 is a block diagram of a remote controller, in accordance with various embodiments.

Referring now to FIG. 2, a block diagram of remote controller 200 is shown. As mentioned, the remote controller allows the user to navigate an on-screen UI by moving the remote controller itself The remote controller has laser diode (s) with diffuser. The light emitted from the remote controller creates a granular interference pattern, a so-called speckle pattern when reflected from a reflective surface, and illuminates imaging sensor which may be implemented on the display device, such as a host consumer electronics (CE)

device, like a TV. When a user moves the RC, the speckle pattern detected by the imaging sensor also moves. By processing the image motion, the motion of the RC is captured and linked to the GUI to control by the display device. In this manner, pointer style remote controller is realized without requiring motion sensor or RF communication. Hence a low cost remote controller with longer buttery life is achieved.

In accordance with certain embodiments, the remote controller has a laser diode 210, optionally one or more lenses (220), and a diffuser 230; these elements cause the remote controller to generate a coherent light beam 115 as shown. The laser diode 210 causes speck-patterned illumination, referred to as interference pattern, to be generated when the coherent light beam 115 is scattered, which is detected by the image sensor 125 of the display device. By processing movement of the detected speckle pattern the display device can determine the movement of the remote controller, which is linked by mapping to the pointer or cursor movement on the on-screen UI.

The laser diode element 210 is operable to emit coherent light, i.e. light in phase, and is coupled in cooperative arrangement with diffuser element 230, which is able to receive the coherent light of the laser-diode and generate the coherent light beam 115 output by the remote controller 200. The light emitted by the laser diode element 210 may be in an infrared range of light for eye-safety considerations and pulse-driven coherent light generated by the laser diode element being driven in pulse operation enhances eye-safety against LD light.

As shown, LD element 210 and diffuser element 230 may be implemented together with optics elements, such as lense(s) 220. The light emitted from the LD is first collimated by these lense(s) 220 before going through diffuser element 230; thus one or more optics elements are coupled to receive and collimate the coherent light emitted by the LD to generate an optic beam shaped from the coherent light. This allows a so-called "speckle pattern" to be generated on an illuminated area, such as on image sensor 125. The speckle pattern is a random pattern generated by the interference of the coherent LD light. Optional optics may be placed to shape the beam divergence to some desired angle.

How the remote controller 200 determines to emit its coherent beam of light may be addressed several ways. The remote controller 200 may additionally have a motion sensor element operable to detect when the remote controller is in use. Thus, the remote controller only generates coherent light beam 115 when the remote controller itself is in motion, indicating that it is being picked up or used by a user. This would cause the laser diode element to emit its coherent light. The motion detector may be of relatively low-technology, as a multiple-axes motion detection may not be needed. Or, a button activated by a user of the remote controller may cause the laser diode element to emit coherent light; for example, the user may press a button on the remote controller labeled "cursor control" or the like.

Figure 3:
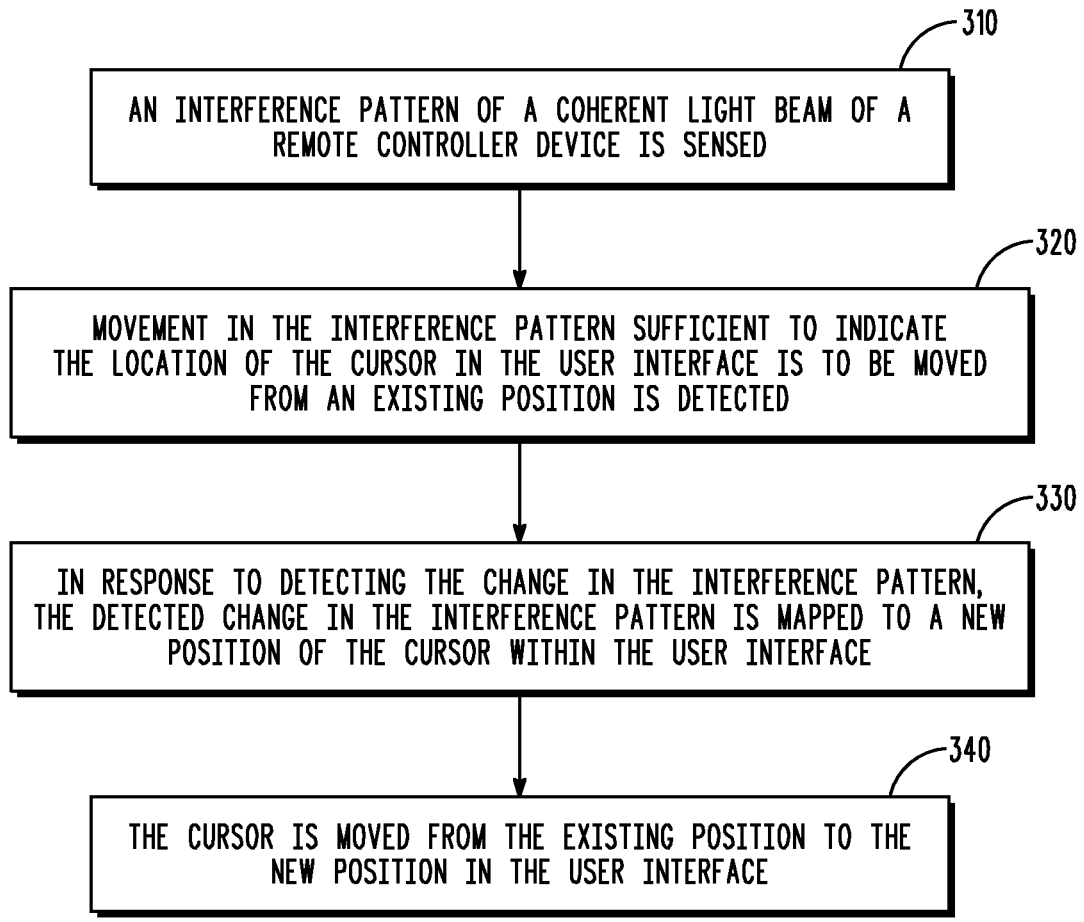
FIG. 3 is a flowchart, illustrative of a method in accordance with various embodiments.

Referring now to FIG. 3, a flowchart 300 illustrates a method in accordance with certain embodiments for linking movement of a remote controller to movement of a cursor in a UI displayed by a display device is illustrated. At Block 310, an interference pattern caused by scattering or impingement of a coherent light beam of a remote controller device is sensed by the sensor element of the display device. At Block 320, movement of the interference pattern sufficient to indicate the location of the cursor in the user interface is to be moved from an existing position is sensed. As described, movement of the interference pattern is caused by movement of the remote controller itself and sensed by a motion sensor element of the display device. In response to detecting the change in the interference pattern, the detected change in the interference pattern is mapped to a new position of the cursor within the user interface. This is accomplished by a processing element of the display device that controls the movement of the cursor in the UI at Block 330. At Block 340, the cursory is moved from the existing position to the new position in the user interface.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of controlling movement of a cursor in a user interface displayed by a display device, comprising:
   in the display device, wherein the display device comprises a sensor element:
   sensing an interference pattern caused by a coherent light beam of a remote controller device impinging on the sensor element;
   detecting movement of the interference pattern to indicate a location where the cursor is to be moved in the user interface from an existing position;
   in response to detecting the movement of the interference pattern, mapping the detected movement in the interference pattern to a new position of the cursor within the user interface, wherein the new position corresponds to the location; and
   moving the cursor from the existing position to the new position in the user interface.

2. The method of claim 1, wherein detecting the movement in the interference pattern is performed by the sensor element mounted on the display device.

3. The method of claim 1, wherein the movement in the interference pattern is caused by moving the remote controller.

4. The method of claim 1, wherein the interference pattern is a speckle pattern.

5. A system, comprising:
   a display device comprising a sensor element, wherein the display device is operable to display a navigable user interface, sense an interference pattern created by a coherent light beam impinging upon the sensor element, wherein the coherent light beam is generated by a remote controller, and detect movement of the interference pattern upon the sensor element, the user interface being navigable by movement of a cursor of the user interface;
   a processing element operatively coupled to the display device to process the interference pattern sensed by the sensor element and the movement of the interference pattern detected by the display device;
   wherein movement of the remote controller causes movement of the interference pattern that is sensed by the display device and mapped by the processing element to corresponding movement of the cursor in the user interface.

6. The system of claim 5, wherein the processing element processes the movement in the interference pattern sensed by the display device and maps the movement in the interference pattern to corresponding movement of the cursor in the user interface.

7. The system of claim 5, wherein the remote controller further comprises:
   a laser diode element operable to emit coherent light; and
   a diffuser element coupled to receive the coherent light and operable to generate the coherent light beam output by the remote controller.

8. The system of claim 7, wherein the coherent light emitted by the laser diode element is in an infrared range of light.

9. The system of claim 7, wherein the coherent light emitted by the laser diode element is a pulse-driven coherent light.

10. A remote controller operable to emit a coherent light beam, comprising:
    a laser diode element operable to emit laser light;
    a diffuser element coupled to receive the laser light from the laser diode element and operable to generate the coherent light beam output by the remote controller; and
    a motion sensor element operable to detect when the remote controller is in use,
    wherein movement of the remote controller causes movement of the coherent light beam and the movement of the remote controller indicates the location where a cursor in a user interface displayed by a display device is to be moved from an existing location.

11. The remote controller of claim 10, wherein the laser light emitted by the laser diode element is in an infrared range of light.

12. The remote controller of claim 11, wherein the laser light emitted by the laser diode element is a pulse-driven coherent light.

13. The remote controller of claim 10, further comprising:
    an optics element coupled to receive and collimate the laser light emitted by the laser diode element to generate an optic beam shaped from the laser light, wherein the diffuser element receives the optic beam from the optics element.

14. The remote controller of claim 9, wherein upon the motion sensor element detecting that the remote controller is in use, the laser diode element emits the laser light.

15. The remote controller of claim 10, wherein the laser diode element of the remote controller emits the laser light upon a user of the remote controller activating a button of the remote controller to activate the laser diode element.

16. The remote controller of claim 10, wherein upon the motion sensor element detecting that the remote controller is in use, the laser diode element emits the laser light.

17. The remote controller of claim 10, wherein the remote controller emits the coherent light beam upon a user of the remote controller activating a button of the remote controller to activate the laser diode element.

18. The remote controller of claim 10, wherein a random interference pattern is generated by the coherent light beam impinging a reflective medium.

19. The remote controller of claim 18, wherein the interference pattern is a speckle pattern.

\* \* \* \* \*